3,187,043
MONOHALOPHOSPHONIUM HALIDES
Angelo John Speziale, Creve Coeur, and Kenneth Wayne Ratts, Overland, Mo., assignors to Monsanto Company, a corporation of Delaware
No Drawing. Filed May 18, 1962, Ser. No. 195,957
16 Claims. (Cl. 260—558)

This invention relates to a process for preparing a novel and useful class of phosphonium salts. More specifically, the new compounds are carbamylhalomethyl trisubstituted phosphonium halides.

The new compounds are prepared by the reaction of elemental halogens with carbamylmethylene trisubstituted phosphorane. The reaction proceeds in accordance with the structural equation:

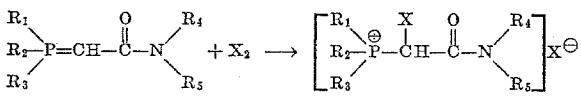

wherein $R_1$, $R_2$ and $R_3$ are hydrocarbon radicals of the class consisting of phenyl, cyclohexyl, aliphatic hydrocarbon radicals of up to six carbon atoms including alkyl, alkenyl and alkynyl; wherein X is a halogen of the group consisting of chlorine, bromine and iodine; and wherein $R_4$ and $R_5$ are selected from the group consisting of hydrogen atoms, phenyl, cyclohexyl, aliphatic hydrocarbon radicals having up to six carbon atoms including alkyl, alkenyl and alkynyl, radicals such that $R_4$ and $R_5$ together are alkylene having from four to seven carbon atoms.

The new class of phosphonium halides are prepared by the direct reaction of elemental halides of the type described with the carbamylmethylene trisubstituted phosphoranes. The reactions are conducted in organic solvent medium, such as chloroform, carbon tetrachloride, ether, benzene, toluene or other volatile hydrocarbons in which the phosphoranes are soluble. The reaction usually proceeds at room temperatures and at subnormal temperatures as low as 0° C. Temperatures above normal temperatures and as high as reflux temperatures of the reaction mixtures may be used.

The phosphonium halides described can be separated from the reaction mixture by evaporating the solvent medium and recrystallizing the crude eproduct from solutions in pentane, chloroform, hexane, benzene, acetone and other inert solvent for the phosphonium halides.

Further details in the preparation of the new phosphonium halides are set forth in the following examples.

*Example 1*

N,N-diphenylcarbamylmethylene triphenylphosphorane was dissolved in chloroform and a 10 percent molar excess of chlorine was added at 0° C. The solution was then permitted to warm to room temperature and the chloroform evaporated. The resulting oil was dissolved in benzene and the solution evaporated until the solid was precipitated. The product was N,N-diphenylcarbamylchloromethyl triphenylphosphonium chloride and was formed in a 93% yield. It was found to have a decomposition point of about 185 to 190° C. and an analysis of 12.77 percent total chlorine and 6.35 percent ionic chlorine.
Calculated for $C_{32}H_{26}ClNOP$: total chlorine, 13.07; ionic chlorine, 6.54.

*Example 2*

The procedure was repeated except that the chloroform solution of N,N-diphenylcarbamylmethylene triphenylphosphorane was saturated with chlorine at 0° C. A 73% yield of the product was obtained.

*Example 3*

The procedure of Example 1 was repeated except that N,N-diethylcarbamylmethylene triphenylphosphorane was reacted with chlorine. Separation of the reaction mixture and recrystallization from pentane yielded N,N-diethylcarbamylchloromethyl triphenylphosphonium chloride.

*Example 4*

By the reaction of N,N-di-n-butylcarbamylmethylene triphenylphosphorane with bromine in a carbon tetrachloride solution produces N,N-di-n-butyl carbamylbromomethyl triphenylphosphonium bromide.

*Example 5*

By the proper selection of the phosphoranes and halogens the following compounds are produced by the above procedures:
N-phenyl-N-ethylcarbamylchloromethyl triphenylphosphonium chloride
N-(6-aminohexyl)carbamylchloromethyl tri-n-butylphosphonium chloride
N,N-diethylcarbamylchloromethyl triphenylphosphonium chloride
N,N-diallylcarbamylchloromethyl triphenylphosphonium chloride
N-cyclohexyl-N-ethylcarbamylbromomethyl triethylphosphonium bromide
N,N-dipropylcarbamyliodomethyl triphenylphosphonium iodide
N-n-carbamylchloromethyltriallylphosphonium chloride
N,N-dipropargylcarbamylbromomethyl triphenylphosphonium bromide
N,N-dimethylcarbamylchloromethyl tricyclohexylphosphonium chloride
N,N-dicyclohexylcarbamyliodomethyl tributynylphosphonium iodide The new class of compounds may be used in the preparation of α-haloacetamides with or without substituents on the amide nitrogen atoms, the latter having useful grass specific herbicidal properties. These end products, which are well known in chemical literature, may be prepared by reacting the phosphonium salts herein claimed with a strong alkali, such as sodium hydroxide, and then hydrolyzing the resulting compound in the presence of a catalyst such as alumina to split off a tertiary phosphine oxide and yield an α-chloroacetamide.

The new class of compounds may be further reacted with a halogen of the group consisting of chlorine, iodine and bromine to substitute an additional atom of the halogen to form compounds of the structure

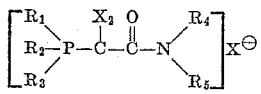

Compounds of the latter type are described and claimed in a copending application, Serial No. 196,001, filed May 18, 1962, of the present inventors but are prepared by a quite different method.

Although the new compounds are described above with reference to specific preparations, it is not intended that the details thereof shall be limitations on the scope of the invention except to the extent incorporated in the following claims.

The embodiments of the invention in which an exclusive property or privilege is claimed are defined as follows:

1. A chemical compound of the structure:

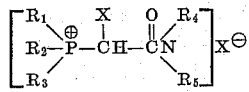

wherein $R_1$, $R_2$ and $R_3$ are selected from the class consisting of phenyl, cyclohexyl, alkyl having up to six carbon atoms, alkenyl having up to six carbon atoms and alkynyl having up to six carbon atoms; wherein $R_4$ and $R_5$ are selected from the class consisting of hydrogen, cyclohexyl, phenyl, alkyl having up to six carbon atoms, alkenyl having up to six carbon atoms and alknyl having up to six carbon atoms; and wherein X is selected from the class consisting of chlorine, bromine and iodine.

2. N,N-dialkyl carbamylchloromethyl triphenylphosphonium chloride wherein each alkyl has up to 6 carbon atoms.

3. N,N-dialkyl carbamylchloromethyl tri-n-butylphosphonium chloride wherein each alkyl has up to 6 carbon atoms.

4. N-phenyl, N-ethylcarbamylchloromethyl triphenylphosphonium chloride.

5. N - (6 - aminohexyl)carbamylchloromethyl tri - n-butylphosphonium chloride.

6. N,N - diethylcarbamylchloromethyl triphenylphosphonium chloride.

7. N,N - diethylcarbamylchloromethyl tri-n-butylphosphonium chloride.

8. N,N - diallylcarbamylchloromethyl tri-n-butylphosphonium chloride.

9. A method of preparing

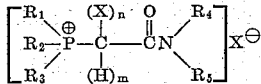

wherein $R_1$, $R_2$ and $R_3$ are hydrocarbon of the group consisting of cyclohexyl, phenyl and aliphatic hydrocarbon having up to 6 carbon atoms; wherein $R_4$ and $R_5$ are radicals selected from the group consisting of hydrogen, cyclohexyl, phenyl and aliphatic hydrocarbon having up to six carbon atoms; wherein $n$ is an integer from one to two, $m$ is an integer from zero to one provided that the sum of $m$ and $n$ is two; and wherein X is selected from the group consisting of chlorine, bromine and iodine; which comprises contacting in an organic liquid solution

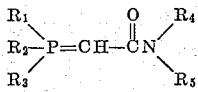

with an elemental halogen of the group consisting of chlorine, bromine and iodine, in the amount required to produce a compound with $n+1$ halogen substituents.

10. A method of preparing N,N-dialkyl carbamlchloromethyl triphenylphosphonium chloride which comprises contacting N,N-dialkyl carbamylmethylene triphenylphosphorane wherein each alkyl has up to 6 carbon atoms with elemental chlorine.

11. A method of preparing N,N-dialkyl carbamylchloromethyl tri-n-butylphosphonium chloride which comprises contacting N,N-dialkyl carbamylmethylene tri-n-butylphosphorane wherein each alkyl has up to 6 carbon atoms with elemental chlorine.

12. A method of preparing N-ethyl, N-phenylcarbamylchloromethyl triphenylphosphonium chloride which comprises contacting N,N-diphenylcarbamylmethylene triphenylphosphorane with elemental chlorine.

13. A method of preparing carbamylchloromethylhexamethyleneimino tri - n - butylphosphonium chloride which comprises contacting N(6-aminohexyl)carbamylmethylene tri-n-butylphosphorane with elemental chlorine.

14. A method of preparing N,N-diethylcarbamylchloromethyl triphenylphosphonium chloride which comprises contacting N,N-diethylcarbamylmethylene triphenylphosphorane with elemental chlorine.

15. A method of preparing N,N-diethylcarbamylchloromethyl tri-n-butylphosphonium chloride which comprises contacting N,N-diethylcarbamylmethylene tri-n-butylphosphorane with elemental chlorine.

16. A method of preparing N,N-allylcarbamylchloromethyl triphenylphosphonium chloride which comprises contacting N,N-diethylcarbamylmethylene triphenylphosphorane with elemental chlorine.

References Cited by the Examiner

UNITED STATES PATENTS 3,005,013   10/61   Grayson et al. _____ 260—562

OTHER REFERENCES

Trippet et al.: Jour. Chem. Soc. (London), pages 3874–3876 (1959).

IRVING MARCUS, *Primary Examiner.*

DUVAL T. McCUTCHEN, WALTER A. MODANCE, *Examiners.*